Bliss & Adams,
Lasting Machine,
N° 69,066. Patented Sept. 24, 1867.

Witnesses:
Samuel N. Piper
G. H. Andrews

Inventors:
C. W. Bliss & O. M. Adams
by their attorney
R. H. Eddy

United States Patent Office.

CHARLES W. BLISS AND OLIVER M. ADAMS, OF MILFORD, MASSACHUSETTS.

Letters Patent No. 69,066, dated September 24, 1867.

IMPROVED BOOT-SHANK LASTER.

The Schedule referred to in these Letters Patent and making part of the same.

TO ALL PERSONS TO WHOM THESE PRESENTS MAY COME:

Be it known that we, CHARLES W. BLISS and OLIVER M. ADAMS, of Milford, in the county of Worcester, and State of Massachusetts, have invented a new and useful Boot-Shank Laster; and do hereby declare the same to be fully described in the following specification, and represented in the accompanying drawings, of which—

Figure 1:
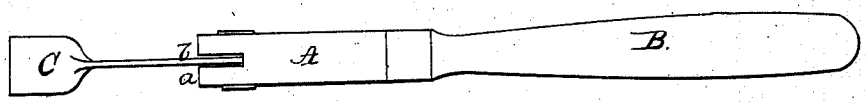
Figure 2:
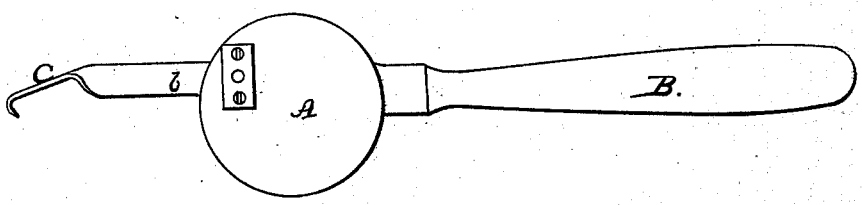
Figure 3:
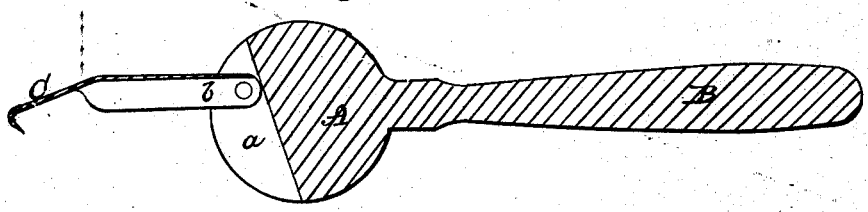

Figure 1 is a top view,
Figure 2 a side elevation, and
Figure 3 a vertical section of it.

In such drawings, A denotes a cam or round block of wood or metal, having a handle, B, extended from its periphery. The said cam has a socket, $a$, made within it and parallel to its opposite sides, and opening out of the periphery of the cam, in manner as represented. Within the socket there is placed the shank $b$ of a claw, C, formed as shown in the drawings. This shank turns freely on a pin, $c$, which goes through it and the cam.

In using the implement, the circumference of the cam is to be placed against one portion of the shank of the upper of a boot when on a last, the claw being extended across the shank and into the other part of the shank of the upper. By turning the cam by means of the handle the cam will adjust itself to the shoe or last, and the claw will draw the shank part of the upper closely down upon the last, so as to enable such part of the upper to be tacked down to the insole preparatory to being stitched or pegged thereto. This little and simple tool we have found very useful and effective for the purpose for which it is intended.

We claim as our invention—

The said boot-shank laster, composed of the cam A, the handle B, and the shanked claw C, arranged and applied together as specified.

CHARLES W. BLISS,
OLIVER M. ADAMS.

Witnesses:
GEO. F. WILLIAMS,
LEWIS FALES.